Figures 1, 2, 3:
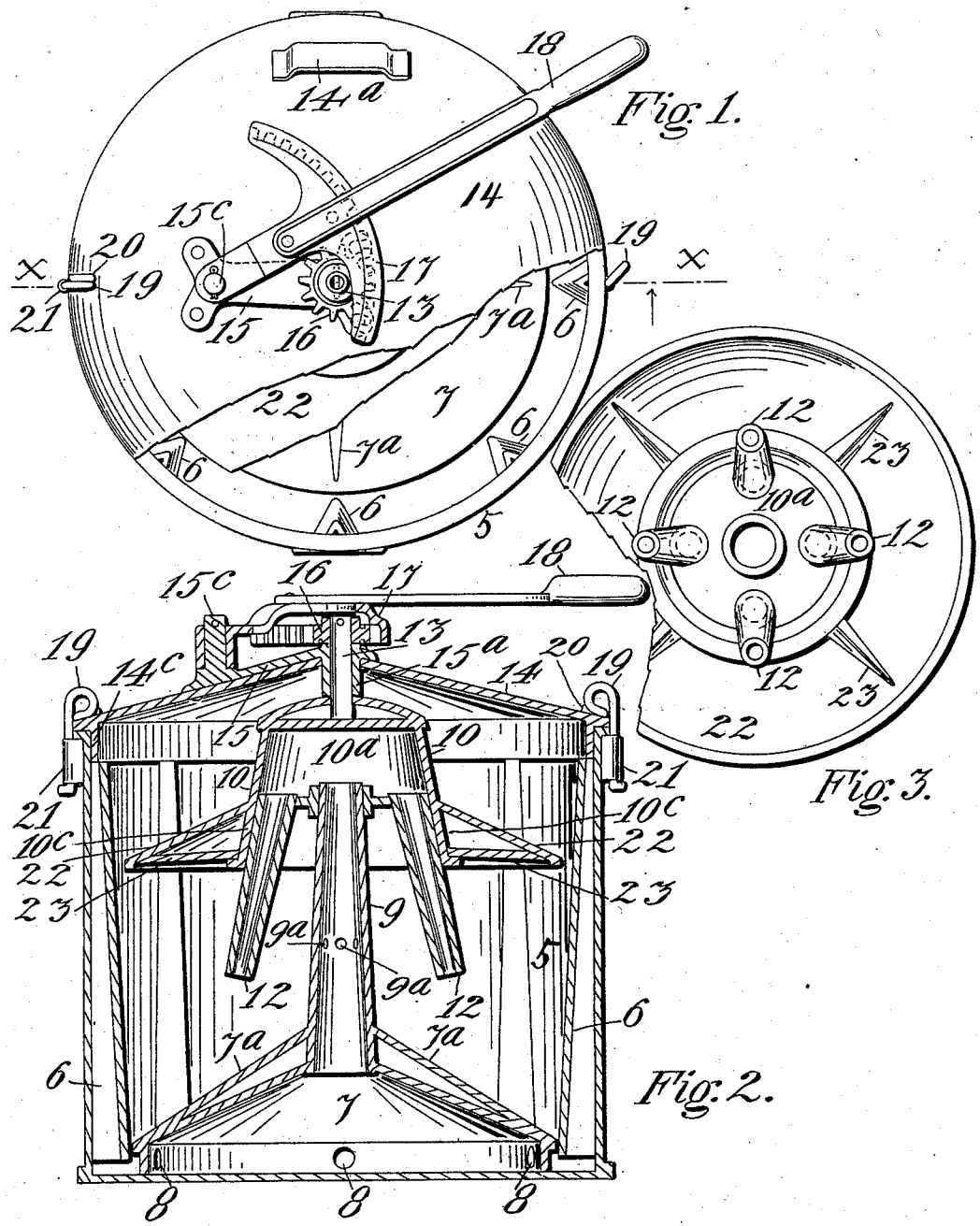

No. 647,433. Patented Apr. 10, 1900.
J. ARNOLD.
WASHING MACHINE.
(Application filed Dec. 4, 1899.)
(No Model.)

Witnesses,
H. M. Neff
Grace Mytinger

Inventor,
Josephine Arnold,
By
Attorney.

UNITED STATES PATENT OFFICE.

JOSEPHINE ARNOLD, OF DENVER, COLORADO.

WASHING-MACHINE.

SPECIFICATION forming part of Letters Patent No. 647,433, dated April 10, 1900.

Application filed December 4, 1899. Serial No. 739,157. (No model.)

*To all whom it may concern:*

Be it known that I, JOSEPHINE ARNOLD, a citizen of the United States of America, residing at Denver, in the county of Arapahoe and State of Colorado, have invented certain new and useful Improvements in Washing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in washing-machines of the class adapted to simultaneously perform the functions of a boiler, a steam-washer, and a hand-washer—that is to say, wherein the clothes may be boiled, steamed, and rubbed at the same time. My improved construction also belongs to that class of washers which are so arranged that the steam and hot water are continuously injected into the center of the mass of clothes, causing a constant circulation of steam and water through the goods, whereby the pores or meshes are opened, the dirt removed, and the garments bleached by the action of the steam, wherein the agitating and rubbing features coöperate with the boiling and steaming features to quickly and thoroughly cleanse the clothes. I attain these results through the instrumentality of the construction hereinafter described, the novel features being subsequently pointed out in the claims.

The invention will be fully understood by reference to the accompanying drawings, in which is illustrated an embodiment thereof.

In the drawings, Figure 1 is a top or plan view of my improved apparatus with parts broken away to better disclose the mechanism within. Fig. 2 is a vertical section taken through the same on the line X X, Fig. 1. Fig. 3 is an underneath view of the rotary device.

Similar reference characters indicating corresponding parts in the views, let the numeral 5 designate a cylindrical tank whose vertical walls are provided on the inside with vertical ribs 6, which are widest at the bottom and taper toward the top. These ribs are hollow and open at both ends to permit a circulation of water therethrough. In the bottom of the tank between the vertical ribs 6 is located a cone-shaped steam-chamber 7, provided with openings 8, communicating with the tank. The top of its chamber is provided with an upwardly-projecting hollow post, which is open at both ends, forming a spout through which the steam and hot water pass from the cone-shaped base of the chamber upwardly. The top of the chamber 7 is provided with ribs $7^a$. The spout 9 is provided with perforations $9^a$, located about midway of its height, through which the boiling water and steam escape into the goods. This spout is circular in cross-section and is largest at the bottom, tapering toward the top, where it is fitted into an opening formed in the bottom of a hollow rotary device 10. The bottom of the device 10 around the spout 9 is provided with openings, into which are fitted and secured downwardly-extending open-ended tubes 12, through which the steam and hot water pass from the chamber $10^a$ of the device 10 downwardly into the mass of clothes in the tank. To the top of the rotary steam-chamber is attached the lower extremity of a spindle 13, which passes upwardly through the center of the cover 14 of the tank. To the top of the cover is attached a bracket 15, provided with a depending sleeve $15^a$, passing through a central opening in the cover 14 and forming a bearing in which the spindle 13 is journaled. To the upper protruding extremity of the spindle is made fast a cogged pinion 16, which rests on the bracket 15 and meshes with a segmental interior gear 17, mounted to turn freely on a vertical journal $15^c$, formed integral with the bracket 15, the gear being provided with a depending collar engaging a shoulder on the bracket, whereby the gear occupies a horizontal plane above the center of the cover, which is cone-shaped, sloping downwardly from the center.

To the gear 17 is attached a hand-lever 18, which may be of any convenient length. The curve of the segmental gear is such that the pinion 16 and its attachments may be given complete rotations in reverse directions by moving the hand-lever back and forth in a horizontal plane within a very limited range or space.

The cover 14 is provided with handles 14ª (one only being shown) for convenience in lifting the cover and its attachments. It is provided with a depending circumferential flange 14ᶜ, which fits within the top of the tank. It is locked against rotation by means of keys 19, whose upper extremities are bent to form eyes engaging lugs 20, attached to the outer top portion of the cover and located at opposite points thereon. These keys are mounted to turn in bearings 21, attached to the top of the tank on the outside. Their lower extremities protrude through their bearings and are turned outwardly to retain the keys in position.

The rotary steam-chamber and agitating device 10 is provided with a depending portion 10ᶜ, extending below the bottom of the steam-chamber and to which is attached exteriorly a flange 22, extending outwardly toward the wall of the tank and adapted to hold the clothes down during the washing operation. This flange is provided on its under surface with ribs 23, adapted to aid in the performance of the rubbing function.

Preparatory to using the device the tank is placed upon a stove or other suitable heating apparatus and a suitable quantity of water placed therein. When the water is sufficiently heated, the clothes to be washed are placed therein, after which the cover, the operating-gears, the hand-lever, and the rotary agitating device, which are all connected together, as heretofore explained, are placed in position, with the flange 22 of the rotary device resting on top of the clothes. While the tank is still resting on the heating apparatus, in order that the boiling of the water may continue, the hand-lever is moved back and forth, turning the rotary agitating device in reverse directions, whereby the clothes are subjected to a scrubbing operation by virtue of the ribs 6, 7ª, and 23, the tubes 12 at the same time alternately squeezing the clothes tightly together while approaching the limit of the stroke in one direction and loosening them while beginning the stroke in the opposite direction. Simultaneously with the mechanical operation just described the steam passes upwardly from the chamber 7 through the spout 9 out of the perforations 9ª into the mass of the clothes and also upwardly into the steam-chamber 10ª of the rotary device and downwardly through the tubes 12 into the central portion of the mass of clothes, whereby the dirt stains and streaks are bleached out and the texture of the goods opened or expanded, allowing the soapsuds to pass through freely, whereby, in conjunction with the squeezing and rubbing function, the maximum cleansing effect of the soapsuds is attained, the dirt being removed and caused to settle in the bottom of the tank.

The foregoing description of the use of the machine is more especially applicable to the washing of white clothes. In the washing of colored goods, whereby steam-bleaching effects are not desired, the operation is the same, except that the water is only moderately heated to prevent the fading of the clothes. Woolen and flannel goods may also be washed without injury by the same operation of the mechanical parts, a moderately-warm suds only being employed.

Having thus described my invention, what I claim is—

1. In a washing-machine, the combination of a tank, a steam-chamber located in the bottom of the tank and having openings forming a communication between it and the tank-chamber, and provided with an open-ended, upwardly-projecting spout, a rotary steam-chamber and agitating device, located in the upper part of the tank, and having an opening into which the spout of the lower chamber fits, the rotary chamber having downwardly-projecting, open-ended tubes adapted to penetrate the mass of goods and discharge thereinto for the purpose set forth.

2. The combination of a tank, a steam-chamber located in the bottom thereof and provided with a central upwardly-projecting spout, a rotary steam-chamber having an opening into which said spout projects, the rotary chamber being provided with downwardly-projecting tubes, adapted to penetrate the mass of goods, a spindle attached to the rotary chamber, a cover for the tank through which the spindle projects, and in which it is journaled, a pinion made fast to the outer extremity of the spindle, a segmental gear journaled outside the center of the cover and formed with interior cogs meshing with the pinion and a hand-lever attached to the gear.

3. The combination of a tank, a steam-chamber located in the bottom thereof and provided with an upwardly-projecting spout, a rotary steam-chamber having an opening into which the said spout projects, the rotary chamber being provided with downwardly-projecting tubes adapted to penetrate the mass of goods, a spindle attached to the rotary chamber, a cover for the tank, a bracket attached to the outer surface of the cover and provided with a depending sleeve projecting through an opening formed in the central part of the cover and forming a bearing for the spindle, a pinion attached to the outer protruding extremity of the spindle, a segmental gear mounted on a journal formed on and projecting upwardly from the bracket, said gear having interior cogs meshing with the pinion, and a hand-lever attached to the gear.

4. The combination of a tank having vertical ribs formed on its inner surface, a conical steam-chamber located in the bottom of the tank and provided with a central upwardly-projecting spout, the outer surface of the chamber being provided with ribs, a rotary steam-chamber located in the upper part of the tank and communicating with the lower chamber by means of the spout, said chamber being provided with downwardly-projecting tubes, and an outwardly-projecting flange provided on its under surface with ribs, and suitable external means for rotating the upper steam-chamber and its connections substantially as described.

5. The combination of a tank, a steam-chamber located in the bottom thereof, and provided with a spout, a rotary steam-chamber located in the upper part of the tank and communicating with the lower chamber by way of the spout, the rotary chamber being provided with a depending portion extending below its bottom, and tubes projecting downwardly from the bottom of the rotary chamber, said tubes being attached to and reinforced by the depending portion of the rotary chamber, and suitable means exteriorly located for operating the rotary steam-chamber substantially as described.

In testimony whereof I affix my signature in presence of two witnesses.

JOSEPHINE ARNOLD.

Witnesses:
GRACE MYTINGER,
A. J. O'BRIEN.